U. S. LANDERS.
WHEEL RIM CLAMPING DEVICE FOR AUTOMOBILE TIRES.
APPLICATION FILED SEPT. 2, 1920.
1,397,813.
Patented Nov. 22, 1921.
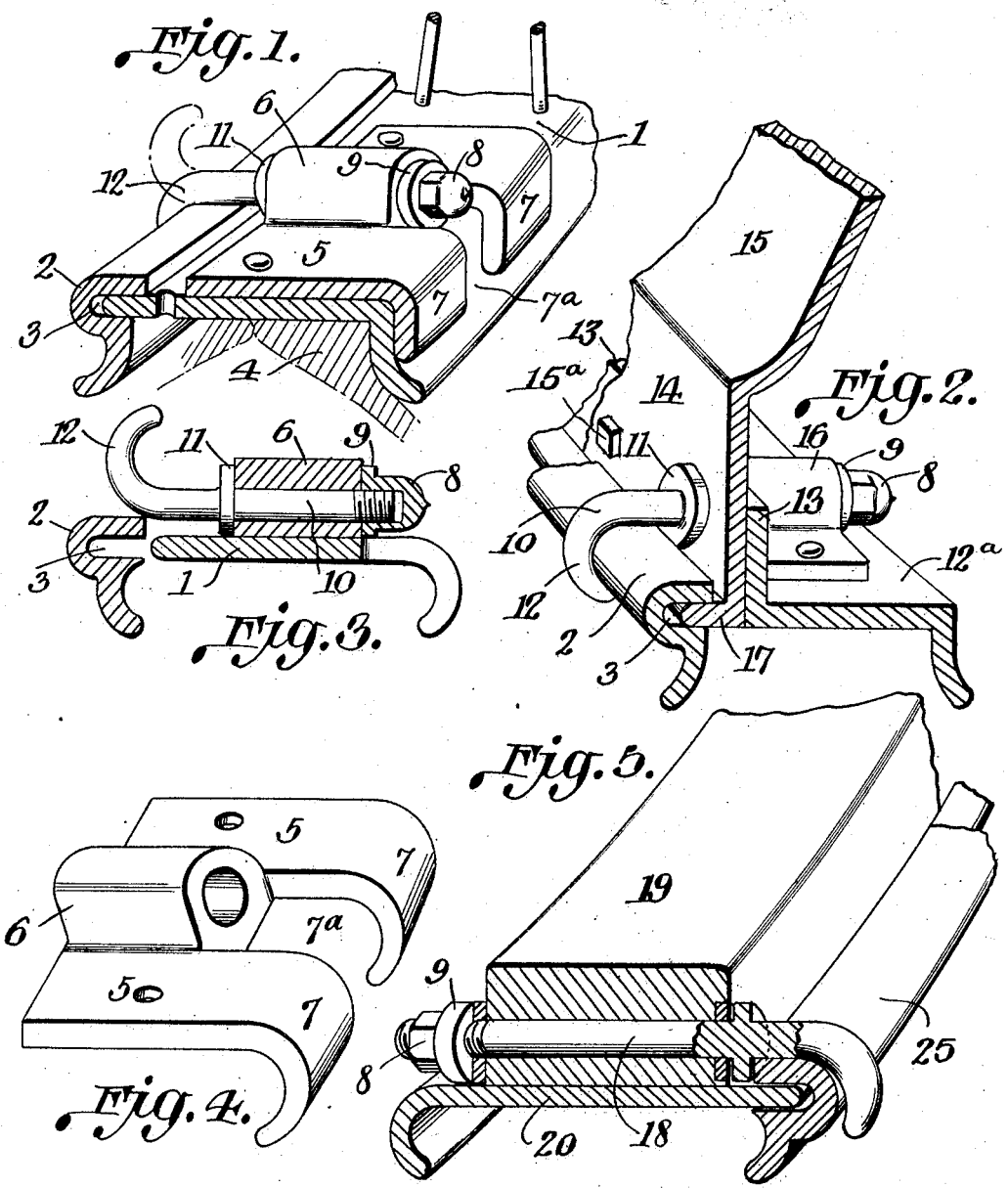
INVENTOR.
Upton S. Landers
BY
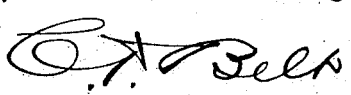
ATTORNEY.

UNITED STATES PATENT OFFICE.

UPTON S. LANDERS, OF BAKERSFIELD, CALIFORNIA.

WHEEL-RIM-CLAMPING DEVICE FOR AUTOMOBILE-TIRES.

1,397,813.   Specification of Letters Patent.   Patented Nov. 22, 1921.

Application filed September 2, 1920. Serial No. 407,742.

*To all whom it may concern:*

Be it known that I, UPTON S. LANDERS, a citizen of the United States, residing at Bakersfield, in the county of Kern and State of California, have invented certain new and useful Improvements in Wheel-Rim-Clamping Devices for Automobile-Tires, of which the following is a specification.

This invention relates to devices for clamping demountable tires to vehicle wheel rims, and pertains especially to a device for clamping a removable or demountable wheel rim member on the main rim member to facilitate removal and replacement of demountable cushion tires.

The object of the invention is to provide a device for clamping a removable rim member, such as covered in my application filed October 9, 1919, Serial No. 329,570, allowed July 6, 1920, in lieu of the pivoted or hinged clamping device also covered in the said application.

A further object of the invention is to provide a rim clamping device which shall be applicable to spoke wheels of motor vehicles as well as to disk web wheels, and when applied to the latter form of wheels, to have the rim clamping device constitute means for securing the annular flange of such disks to the wheel rim.

Various other objects, advantages and improved results are attainable in the manufacture and utilization of the clamping device, as will hereinafter appear.

In the accompanying drawings forming part of this application:—

Figure 1 is a sectional perspective view of part of a spoked wheel rim showing the application of the invention, the unclamped position of the clamping device being shown in dotted lines.

Fig. 2 is a similar view showing the application of the clamping device to a disk web wheel.

Fig. 3 is a sectional view of the clamping device.

Fig. 4 is a detail perspective view of part of the clamping device.

Fig. 5 is a sectional perspective view showing a modification of the device.

The same reference characters denote the same parts throughout the several views of the drawings.

The subject of this application embodies changes and improvements in the hook bolt clamp shown but not claimed in my previously mentioned allowed application, and this application also utilizes the demountable rim member claimed in said allowed application, therefore the said demountable rim member will only be shown and described herein for the purpose of carrying out this invention, while the main rim member herein shown and described as Figs. 1, 3 and 5 is substantially the same as the main rim member covered in the said allowed application.

As shown in Figs. 1, 3 and 5 the main or mounting rim member 1, and the demountable or clamping rim member 2 are for spoked wheels and are so relatively constructed and arranged as to afford a take-up space 3 between said members for clamping a cushion tire as 4 therebetween. There being a plurality of the clamping devices distributed throughout the wheel rim, only one of each form of said device will be described in detail herein.

Upon the inner periphery of the main rim member 1, there is riveted or otherwise secured, as shown in Figs. 1 and 3, a clamping member 5 comprising a journal bearing 6 having arms 7 extending therefrom for overlapping engagement with the outer or curved edge of the said main rim member 1, so as to leave a space 7ª between the arms for the working of a cap nut 8 and its flange 9 against one end of the bearing 6, for securing the clamping bolt 10 in the bearing 6. The bolt 10 has a flange 11 engaging the other end of the bearing 6, and from this flange projects a hook member 12 of the bolt. The bolt is turned in the bearing so as to have the hook engage the demountable rim member 2 for clamping said rim member in clamping a tire on said rim member 1, and in such clamping operation the space 3 between the rim members permits lateral transverse movement of said members with the member 2 abutting against the hook during tire inflation, so that the said take-up space prevents abutment of said members at any time.

Referring to Fig. 2 of the drawings, the main rim member 12ª has a flange 13 against which the flange 14 of a wheel disk 15 fits and these flanges are secured together by bolts 15ª, and by the same character of hooked bolts as hereinbefore described, which extend through the flanges 13 and 14, and are anchored in a bearing 16 secured to the main member 12ᵃ, adjacent to the flange 13. The flange 14 has a lateral annular plate or wing projection 17, as for a continuation of the main rim member 12, and said plate or wing fits a socket in the demountable rim member 2, hereinbefore shown and described, so as to permit the bolt hook to be turned into and out of engagement with the member 2, in a tire clamping operation.

Referring to Fig. 5 of the drawings, the clamping bolt has a lengthened shank 18 which extends through a wooden felly 19 for clamping the rim members 20 and 25 together, as hereinbefore described.

Obviously the clamping bolts and their journal bearings constitute the principal features for locking the various rim members together so as to permit relative expansion and contraction of said members for tire inflation, and said bolts constitute a securing means between a wheel disk and certain of the rim members.

I do not wish to limit my invention in size, material and application, but reserve the right to make such changes and variations in the manufacture and practical utility of the same as may come within the spirit of the appended claim.

Having thus described my invention what I claim as new and desire to secure by Letters Patent is:—

A rim clamping device for automobile wheels, including a main rim member, a demountable rim member fitting one edge of the main rim member, clamping members secured to the inner periphery of the main rim member and each comprising a tubular bearing having arms spaced apart and overlapping the outer edge of the main rim member, and clamping bolts having flanges abutting against the ends of the tubular bearings for engaging and disengaging the demountable rim member, opposite the space between said arms.

In witness whereof I hereunto set my hand in the presence of two witnesses.

UPTON S. LANDERS.

Witnesses:
CHAS. N. SEARS,
W. E. MOODY.